Oct. 2, 1951 F. M. BAILEY 2,570,088

DIRECT-CURRENT AMPLIFIER

Filed April 14, 1950

Inventor:
Francis M. Bailey,
by Claude H. Mott
His Attorney.

Patented Oct. 2, 1951 2,570,088

UNITED STATES PATENT OFFICE 2,570,088

DIRECT-CURRENT AMPLIFIER

Francis M. Bailey, Scotia, N. Y., assignor to General Electric Company, a corporation of New York Application April 14, 1950, Serial No. 156,024

1 Claim. (Cl. 179—171)

My invention relates to electronic amplifiers and, more particularly, to direct current amplifiers employing current feedback.

High gain direct current or direct voltage amplifiers, which are important to many branches of engineering and research, are generally inherently unstable so that their use is limited. Because the problem of building satisfactory high gain direct current amplifiers is an old one, there have been many feedback schemes applied to direct current amplifiers in order to reduce the inherent voltage drifts, but none of these to my knowledge have been particularly satisfactory.

While my invention will be described as applied to a direct voltage amplifier, it is to be understood that it is not limited to such application, as the disclosure in this respect is merely illustrative for purposes of explaining the inventive concept and the invention applies equally well to a direct current amplifier.

It is, therefore, an object of my invention to provide a direct voltage amplifier in which the voltage does not drift.

It is a further object of my invention to provide a high gain direct voltage amplifier circuit employing a novel feedback arrangement which prevents any voltage drift from occurring in the output of the amplifier.

In attainment of the foregoing objects, I provide a cutoff magnetron whose magnetic field may be produced by a pair of coils, by a permanent magnet, or by both. The input signal to the amplifier is supplied to one coil, and the other coil is connected to the output terminals of a conventional voltage amplifier, the input terminals of which are supplied with a voltage signal from the output of the cutoff magnetron. Because a current feedback of 100% is employed the output voltage from the amplifier is independent of the gain of the amplifier and, consequently, dependent upon the input signal and upon the number of turns in each of the previously mentioned coils. Although the stability of the output voltage of this amplifier may suffer from temperature variations in the input and the output resistors, this problem may be solved by one of the many known methods of temperature compensation.

The novel features which I believe to be characteristic of my invention are set forth with particularity in the appended claim. My invention itself, however, both as to its organization and method of operation may best be understood by reference to the following description taken in connection with the figures of the accompanying drawing in which Fig. 1 is a schematic electric circuit diagram of my invention and in which Fig. 2 is a chart of a curve of current versus magnetic field intensity which may be applied to the circuit of Fig. 1.

Figure 1:
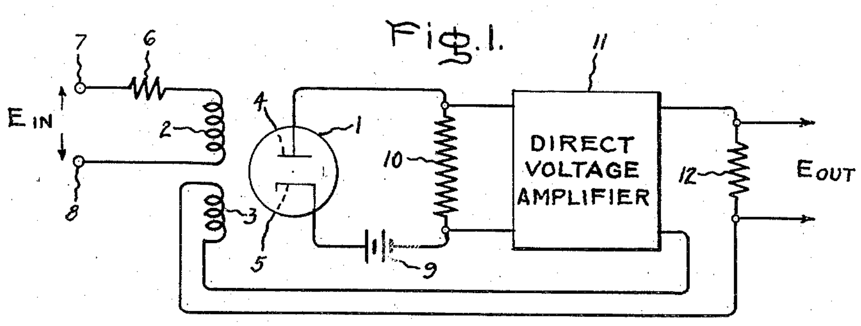
Figure 2:
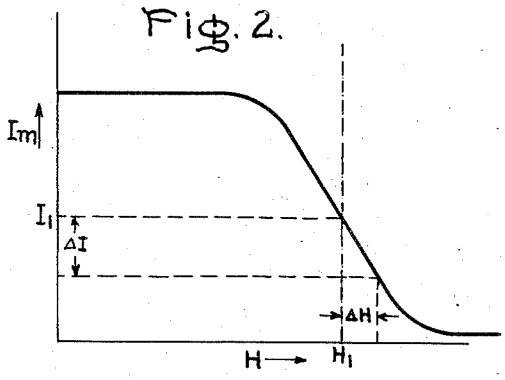

Referring to Fig. 1, a cutoff magnetron 1 comprising a pair of field windings 2 and 3, and an electronic valve having an anode 4 and a cathode 5, has a current output which varies with respect to the magnetic field intensity appearing between its anode and its cathode according to the curve shown in Fig. 2. It should be noted in the curve of Fig. 2 that variation of the magnetic field intensity about a value indicated by a dotted line labeled $H_1$ results in a linear variation of the current output of the magnetron. Decreasing the field intensity increases the output current while increasing the field intensity decreases the output current. H, magnetic field intensity between anode 4 and cathode 5, is directly dependent upon the currents in coils 2 and 3, and, therefore, the output current of the magnetron is also dependent upon these two currents. Winding 2 and a resistance 6, which in a practical circuit may either be the resistance of winding 2 or a separate resistor, are serially connected between a terminal 7 and a terminal 8, and an input voltage signal is applied between terminal 7 and terminal 8. A direct voltage source 9 supplies anode voltage for device 1, and a load resistor 10 electrically connected between anode 4 and cathode 5 has a voltage developed across it which is according to a well-known law of electric circuitry proportional to the anode current of the magnetron. The voltage drop across resistor 10 is supplied to the input terminals of any high gain conventional direct voltage amplifier 11, and the output terminals of amplifier 11 have connected between them the series connection of winding 3 and output resistor 12. The quiescent value of field intensity $H_1$ may be supplied from a direct current in either winding 2 or winding 3 or both, or perhaps by a permanent magnet (not shown in the drawing). Corresponding to a magnetic field intensity of $H_1$, there is a current $I_1$ through resistor 10 as shown in the curve of Fig. 2, and the voltage developed across resistor 10 by this current is supplied to direct voltage amplifier 11.

In operation, the voltage signal to be amplified is supplied between terminal 7 and terminal 8 and causes a change in the current in winding 2 which produces a change in the magnetic field intensity appearing between anode 4 and cathode 5. If the signal applied to terminals 7 and 8 is such as to cause a positive change of $\Delta H$ in magnetic field intensity as shown in Fig. 2, a corresponding change of $\Delta I$ in the current in resistor 10 results. Because this increment of current produces a negative voltage change across resistor 10, the incremental change of output voltage appearing across resistor 12 may also be negative, and by the proper selection of the direction in which winding 3 is wound, $\Delta H$ produced by the change in current through coil 2 is exactly compensated for by the $\Delta H$ produced by winding 3. Consequently, the magnetic field intensity appearing between anode 4 and cathode 5 is held at a value of $H_1$. Because the number of turns in winding 3 is less by a determinable amount than the number of turns in winding 2, the current required in winding 3 to produce a field intensity which compensates for the field intensity of winding 2 is larger than the current through winding 2, and, therefore, a voltage is developed across resistor 12 which is larger than, but proportional to, the input voltage signal. It can be seen from a mathematical analysis of this circuit that with sufficient gain in amplifier 11 the output voltage is dependent upon the value of resistor 6, the value of resistor 12, the ratio of the number of turns in winding 2 to the number of turns in winding 3, and to the input voltage.

$$E_{\text{out}}=\frac{R_2}{R_1}\frac{N_1}{N_2}e$$

$R_2$, ohmic value of $R_{12}$
$R_1$, ohmic value of $R_6$
$N_1$, number of turns in coil 2
$N_2$, number of turns in coil 3
$e$, input voltage This equation shows that the output voltage which appears across resistor 12 is independent of the gain of amplifier 11, and that the amplification of the system may be controlled by selection of the values of resistor 6 and resistor 12, by selection of the number of turns in winding 2, and in winding 3. Therefore, the over-all gain of the system is independent of the gain of amplifier 11, and a constant gain system results. Any inherent voltage drift in amplifier 11 produces a change in current through winding 3 which changes the magnetic field intensity between anode 4 and cathode 5 such as to change the voltage drop across amplifier 11 to compensate for this inherent voltage drift. From an observation of the previously cited equation, it can be seen that except for changes in resistance value of resistors 6 and 12 due to temperature variations, the gain of this amplifier is independent of temperature. There are resistors well known in the art whose value is substantially constant throughout a wide temperature range, and, therefore, with the selection of resistors such as these for resistor 6 and resistor 12, this amplifier is substantially free from voltage drifts.

While it will be understood that circuit operation of the high gain direct voltage amplifier shown in Fig. 1 may vary according to the design for any particular application, the following values for circuit parameters which are suitable for such a voltage amplifier are included by way of example only:

| | | |
|---|---|---|
| $R_6$ | ohms | 10 |
| $R_{12}$ | do | 1000 |
| $N_1$ | turns | 1000 |
| $N_2$ | do | 10 |
| Gain of the system | | 10,000 |

While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

In a constant gain unidirectional signal amplifier, a cutoff magnetron having an anode, a cathode and a pair of magnetizing field windings, one of said field windings being adapted to be connected to a source of unidirectional signal voltage variable in magnitude and direction, a source of unidirectional current supply and a load resistor connected in series circuit relation between said anode and cathode, magnetizing means for maintaining the anode-cathode current at an intermediate point of the linear portion of its field-current characteristic in the absence of signal voltage, a direct voltage amplifier subject to variation in gain connected across said load resistor and having output terminals, and an output resistor connected in series circuit relation with the other said field winding across the output terminals of said direct voltage amplifier, said other field winding being disposed to oppose changes in magnetron field strength resulting from the imposition of signal voltage on said one field winding.

FRANCIS M. BAILEY.

REFERENCES CITED

The following references are of record in the file of this patent:

UNITED STATES PATENTS

| Number | Name | Date |
|---|---|---|
| 2,124,031 | Freese et al. | July 19, 1938 |
| 2,130,132 | Hollmann | Sept. 13, 1938 |
| 2,432,748 | Glass | Dec. 16, 1947 |